(12) United States Patent
Ryon et al.

(10) Patent No.: US 12,184,779 B1
(45) Date of Patent: Dec. 31, 2024

(54) DECENTRALIZED ROOT STORE

(71) Applicant: Rockwell Collins, Inc., Cedar Rapids, IA (US)

(72) Inventors: Luke E. Ryon, Cedar Rapids, IA (US); Stefano Sebastio, Cork (IE); Davide Martintoni, Sanzeno (IT); Riccardo Orizio, Cork (IE)

(73) Assignee: Rockwell Collins, Inc., Cedar Rapids, IA (US)

( * ) Notice: Subject to any disclaimer, the term of this patent is extended or adjusted under 35 U.S.C. 154(b) by 255 days.

(21) Appl. No.: 17/947,959

(22) Filed: Sep. 19, 2022

(51) Int. Cl.
*H04L 29/06* (2006.01)
*H04L 9/30* (2006.01)

(52) U.S. Cl.
CPC ........................................ *H04L 9/30* (2013.01)

(58) Field of Classification Search
CPC ...................................... H04L 9/30; H04L 9/50
See application file for complete search history.

(56) References Cited

U.S. PATENT DOCUMENTS

| | | | |
|---|---|---|---|
| 6,215,872 B1 * | 4/2001 | Van Oorschot | H04L 63/0272 380/278 |
| 9,258,120 B1 * | 2/2016 | Allen | H04L 9/0891 |
| 9,397,990 B1 | 7/2016 | Taly et al. | |
| 9,635,000 B1 * | 4/2017 | Muftic | H04L 9/3239 |
| 10,891,612 B2 | 1/2021 | Lu et al. | |
| 11,055,419 B2 | 7/2021 | Williams et al. | |
| 11,068,473 B1 | 7/2021 | Wyner et al. | |
| 11,281,779 B2 * | 3/2022 | Scriber | G06F 21/33 |
| 11,528,138 B2 * | 12/2022 | Bonnell | H04L 9/006 |
| 11,706,038 B1 * | 7/2023 | Thakore | H04L 9/006 713/153 |
| 2015/0244690 A1 * | 8/2015 | Mossbarger | H04L 9/50 713/171 |
| 2017/0338967 A1 * | 11/2017 | Lewison | H04L 9/0643 |
| 2017/0346639 A1 * | 11/2017 | Muftic | H04L 9/3247 |
| 2017/0352027 A1 | 12/2017 | Zhang et al. | |
| 2018/0337769 A1 | 11/2018 | Gleichauf | |
| 2019/0108232 A1 | 4/2019 | Calcaterra et al. | |
| 2019/0123903 A1 * | 4/2019 | Fu | H04L 63/0823 |
| 2019/0238316 A1 * | 8/2019 | Padmanabhan | H04L 67/1095 |
| 2019/0392530 A1 | 12/2019 | Kursun | |
| 2020/0059354 A1 | 2/2020 | Yang et al. | |

(Continued)

FOREIGN PATENT DOCUMENTS

WO  WO-2019161412 A1 * 8/2019 ............. G06Q 20/02

OTHER PUBLICATIONS

Countermeasures against Sybil Attacks in WSN based on Proofs-of-Work (Year: 2013).*

(Continued)

*Primary Examiner* — Ka Shan Choy
(74) *Attorney, Agent, or Firm* — Suiter Swantz IP

(57) ABSTRACT

A network is described. The network is a peer-to-peer network of nodes. The nodes maintain a distributed ledger. The distributed ledger includes a list of transactions. The list of transactions includes various transactions for maintaining a decentralized root store between the nodes. The decentralized root store includes a list of certificate authorities which are trusted by the nodes in the network. The root certificates may be retrieved from the distributed ledger, validated, and then used to access the certificate authorities.

19 Claims, 11 Drawing Sheets

100

(56) References Cited

U.S. PATENT DOCUMENTS

| | | | |
|---|---|---|---|
| 2021/0357927 A1* | 11/2021 | Kita | G06Q 20/38215 |
| 2022/0103453 A1* | 3/2022 | Novotny | H04L 9/3239 |
| 2022/0294647 A1* | 9/2022 | Li | H04L 9/3247 |
| 2023/0033192 A1* | 2/2023 | Sutherland | G06F 21/602 |

OTHER PUBLICATIONS

Brunner, Clemens et al., "A Comparison of Blockchain-based PKI Implementations", Proceedings of the 6th International Conference on Information Systems Security and Privacy, ICISSP 2020, 8 pages.

Buchman, Ethan, "Tendermint: Byzantine Fault Tolerance in the Age of Blockchains" University of Guelph, Ontario, Canada, 2016, Dissertation, 109 pages.

De Angelis, Stefano et al., "PBFT vs Proof-Of-Authority Applying the CAP Theorem to Permissioned Blockchain", https://www.researchgate.net/publication/320619309_PBFT_vs_proof-of-authority_applying_the_CAP_theorem_to_permissioned_blockchain, EU H2020 Sunfish Project, Grant No. 644666, Uploaded Jan. 15, 2018, 12 pages.

Douceur, John R., "The Sybil Attack", Microsoft Research, johndo@microsoft.com, Uploaded Sep. 16, 2022, 6 pages.

Popov, Serguei, "The Tangle", Apr. 30, 2018, Version 1.4.3, Uploaded Sep. 16, 2022, 28 pages.

\* cited by examiner

510

```
┌─────────────────────────┐
│ 512                     │
│   ADD ROOT CERTIFICATE  │
└─────────────────────────┘

┌─────────────────────────┐
│ 514                     │
│      REVOKE ROOT        │
│       CERTIFICATE       │
└─────────────────────────┘

┌─────────────────────────┐
│ 516                     │
│       UPDATE KEY        │
└─────────────────────────┘

┌─────────────────────────┐
│ 518                     │
│       ROOT STORE        │
└─────────────────────────┘
```

FIG. 5B

800

DECENTRALIZED ROOT STORE

TECHNICAL FIELD

The present invention generally relates to public-key encryption, and more specifically to root stores.

BACKGROUND

Public Key Infrastructure (PKI) refers to the distribution of digital certificates used in public-key encryption. The PKI includes a certificate authority (CA). The certificate authority signs and publishes a name of an entity with a public key. Multiple certificate authorities may exist which run independently federated PKI infrastructures. To access the public keys maintained by the certificate authorities, users must access each of the certificate authorities independently. Maintaining valid certificates for the certificate authorities may require a significant time expenditure. There are two solutions for addressing federated PKIs: a PKI trust bridge or a trusted root store. Both solutions rely on a centralized entity, such as a consortium, to manage the trust interactions between the various entities.

For a PKI trust bridge, two PKI entities can create a bridge whereby each entity fully trusts the other entity. The PKI entities do this by signing the other party's root or intermediate certificate authority thereby granting trust to that other party. Two well-known implementation of trust bridges are CertiPath™ and the US Federal Public Key Infrastructure (FPKI). When extending trust to additional parties, all partners must agree to a common certificate policy and to common certificate practices. The common certificate practices often require periodic independent audits to ensure continued compliance. The membership and auditing costs associated with being a member of the PKI trust bridge may also be relatively high.

For a trusted root store, some entity creates a list of trusted root certificates and then uses that list to establish trust. As described by the U.S. Federal Identity, Credential, and Access Management (FICAM) program, a "trust store is a list of root, intermediate, and sometimes user certificates that are trusted by the operating system or application to process transactions." The trust store may also be referred to as a root store. There are two primary roles within a trust store: (Public key infrastructure) PKI operators and PKI users. There is also a third role for a root store administrator in a centralized root store. The PKI operator is responsible for operating its PKI and submits their root certificates to the root store for incorporation in the list of trusted certificates. When performing a PKI operation, a PKI user requests the current list of trusted certificates from the root store; the PKI user is then able to perform PKI operations that rely on those certificates. Often, the root store is built into the operating system or application (e.g., browser) that the PKI user is relying on. The manager of the software then has the responsibility to ensure that the root store is valid and updated. Typically, trusted root stores are associated with the application that uses the store. Some examples include Windows™, Google Chrome™, or Mozilla™ trusted root stores. Each of these root stores is managed by the application entity and in some cases can be updated by local device administrators. The root stores must thus be managed by a trusted centralized organization that create and manage the policies for the root store.

The PKI trust bridge and trusted root stores may require a trusted centralized organization to create and maintain the trust bridge or root store. Additionally, the PKI trust bridge and trusted root stores may include a perpetual cost of infrastructure for the centralized entity. Therefore, it would be advantageous to provide a device, system, and method that cures the shortcomings described above.

SUMMARY

A node is described, in accordance with one or more embodiments of the present disclosure. In some embodiments, the node includes a network interface coupling the node to a peer-to-peer network. In some embodiments, the node includes a memory maintaining program instructions, a root store policy, and an instance of a distributed ledger. In some embodiments, the distributed ledger includes a decentralized root store. In some embodiments, the decentralized root store includes a list of trusted root certificates. In some embodiments, the root store policy includes one or more requirements to be included in the list of trusted root certificates. In some embodiments, the node includes one or more processors configured to execute the program instructions. In some embodiments, the program instructions cause the one or more processors to receive one or more transactions from the peer-to-peer network. In some embodiments, the program instructions cause the one or more processors to transmit a validation of the one or more transactions to the peer-to-peer network in response to validating the one or more transactions. In some embodiments, the program instructions cause the one or more processors to execute a consensus mechanism to resolve one or more conflicts. In some embodiments, the program instructions cause the one or more processors to publish a new block to the peer-to-peer network. In some embodiments, the new block includes the one or more transactions. In some embodiments, the new block is cryptographically linked to a previous block in the distributed ledger. In some embodiments, the one or more transactions include adding a root certificate to the list of trusted root certificates.

A peer-to-peer network is described, in accordance with one or more embodiments of the present disclosure. In some embodiments, the peer-to-peer network comprises a plurality of nodes. In some embodiments, each of the plurality of nodes includes a network interface coupling the node to the peer-to-peer network. In some embodiments, each of the plurality of nodes includes a memory maintaining program instructions, a root store policy, and an instance of a distributed ledger. In some embodiments, the distributed ledger includes a decentralized root store. In some embodiments, the decentralized root store includes a list of trusted root certificates. In some embodiments, the root store policy includes one or more requirements to be included in the list of trusted root certificates. In some embodiments, each of the plurality of nodes includes one or more processors configured to execute the program instructions. In some embodiments, the program instructions cause the one or more processors to receive one or more transactions from the peer-to-peer network. In some embodiments, the program instructions cause the one or more processors to transmit a validation of the one or more transactions to the peer-to-peer network in response to validating the one or more transactions. In some embodiments, the program instructions cause the one or more processors to execute a consensus mechanism to resolve one or more conflicts. In some embodiments, the program instructions cause the one or more processors to publish a new block to the peer-to-peer network. In some embodiments, the new block includes the one or more transactions. In some embodiments, the new block is cryptographically linked to a previous block in the distributed ledger. In some embodiments, the one or more transactions include adding a root certificate to the list of trusted root certificates.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 5B depicts transactions of a block including a root store, in accordance with one or more embodiments of the present disclosure.

DETAILED DESCRIPTION OF THE INVENTION

Figure 1:
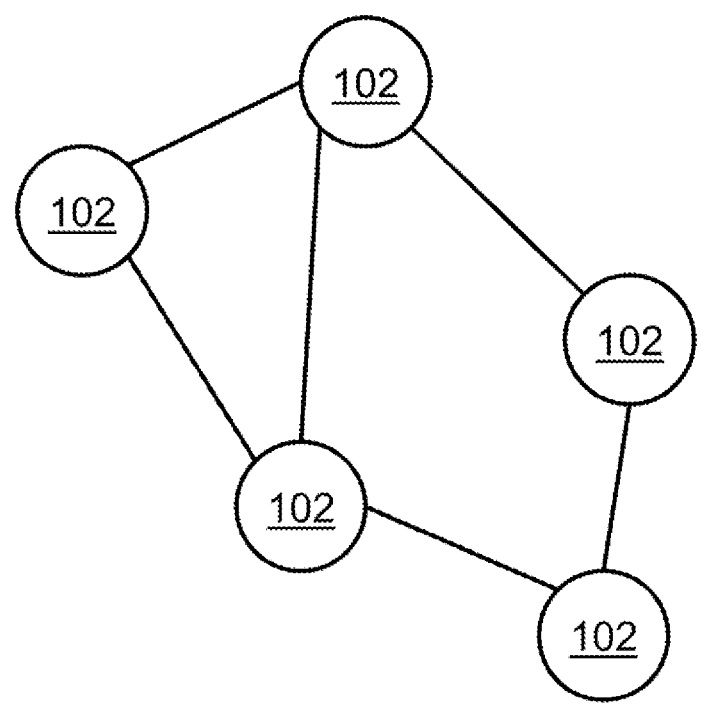
FIG. 1 depicts a network of a nodes, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are directed to a decentralized root store. Decentralized may refer to multiple entities being responsible for accepting/denying who is part of the blockchain, such that no one entity is entirely responsible. Decentralized allows opportunities for organizations of varying sizes and additionally competing organizations. Decentralized allows one common policy, agreed standard, set of trust agreed to by the organizations. All organizations may then use the policy. The decentralized root store uses blockchain technology to provide consensus and governance of the root store. A number of features are contemplated, such as, but not limited to, public blockchains, permissioned blockchains, governance, and other features for a trusted root store. The blockchain may exhibit decentralized characteristics which may provide lower entry costs, lower annual maintenance costs, and limited participant liability. Additional benefits include eliminating the needs for a single trusted party that acts as the root of trust and eliminating single points of failure when retrieving trust information.

Referring now to FIG. 1, a network 100 is described, in accordance with one or more embodiments of the present disclosure. The network 100 may include one or more nodes 102. The nodes 102 in the network may also be referred to as participants. The nodes 102 may be connected to each other. The nodes 102 may function as a server and/or a client such that the network 100 may be considered a peer-to-peer (P2P) network. Peer-to-peer may refer to a network configuration where the nodes 102 do not all access a single access point or server. The nodes 102 may find the other nodes in the network 100 using any suitable process, such as, but not limited to, a P2P discovery process and the like. The P2P discovery process may find an IP address for the active nodes in the network 100.

In embodiments, the network 100 includes a Public-Key Infrastructure (PKI) user. The Public-Key Infrastructure user may retrieve a distributed digital ledger from one or more of nodes of the network 100. The distributed digital ledger may include a list of trusted root certificates. The Public-Key Infrastructure user may use a trusted root certificate from the list of trusted root certificates to access a name and public-key pair maintained by a certificate authority. The Public-Key Infrastructure user may rely on the list of trusted root certificates due to the one or more validation techniques described further herein.

Figure 2:
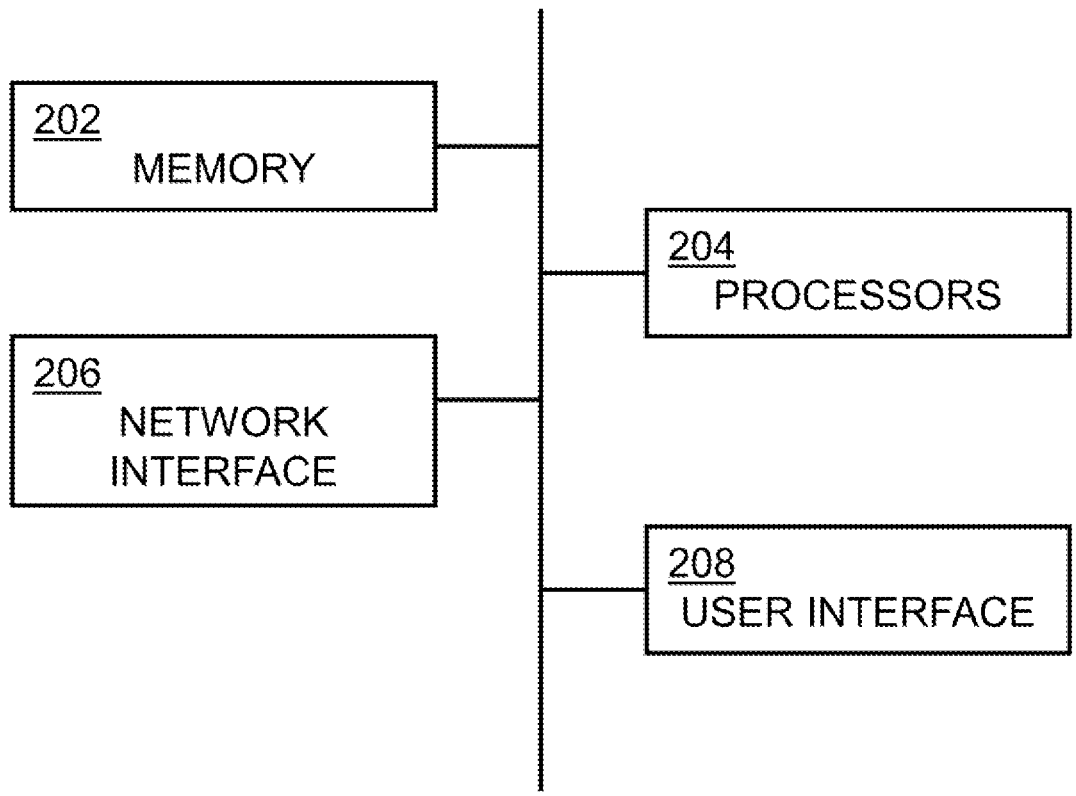
FIG. 2 depicts a simplified block diagram of a node, in accordance with one or more embodiments of the present disclosure.

Referring now to FIG. 2, the nodes 102 are described, in accordance with one or more embodiments of the present disclosure. The nodes 102 may also be referred to as a computer node, a data center node, and the like. The nodes 102 may include one or more components, such as, but not limited to, a memory 202, one or more processors 204, a network interface 206, a user interface 208, and the like. One or more of components of the nodes 102 may be communicatively coupled by one or more control buses or the like.

The memory 202 may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure. The memory may include an operating system. The operating system may functionally organize the node by invoking operations in support of software processes and/or services.

The one or more processors 204 may include any processing unit known in the art. For example, the processors may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

The network interface 206 may include any suitable network interface for interfacing with the network 100, such as, but not limited to, a wired or a wireless network interface.

The network interface may include mechanical, electrical, or signaling circuitry for communicating data to and from the network and subsequently to various other nodes. The node 102 may be configured to receive various input signals and transmit various output signals from the network interface. The network interface 206 may couple the node 102 to the network 100.

The user interface 208 may include, but is not limited to, one or more desktops, laptops, tablets, and the like. In embodiments, the user interface includes a display used to display data to a user. The display of the user interface may include any display known in the art. For example, the display may include, but is not limited to, a liquid crystal display (LCD), an organic light-emitting diode (OLED) based display, or a CRT display. Those skilled in the art should recognize that any display device capable of integration with a user interface is suitable for implementation in the present disclosure. In embodiments, a user may input selections and/or instructions responsive to data displayed to the user via a user input device of the user interface. The node may be configured to receive an input from a user by the user interface. Thus, the user interface may allow the user to interact with the node, including through the execution of stored procedures.

Figure 3:
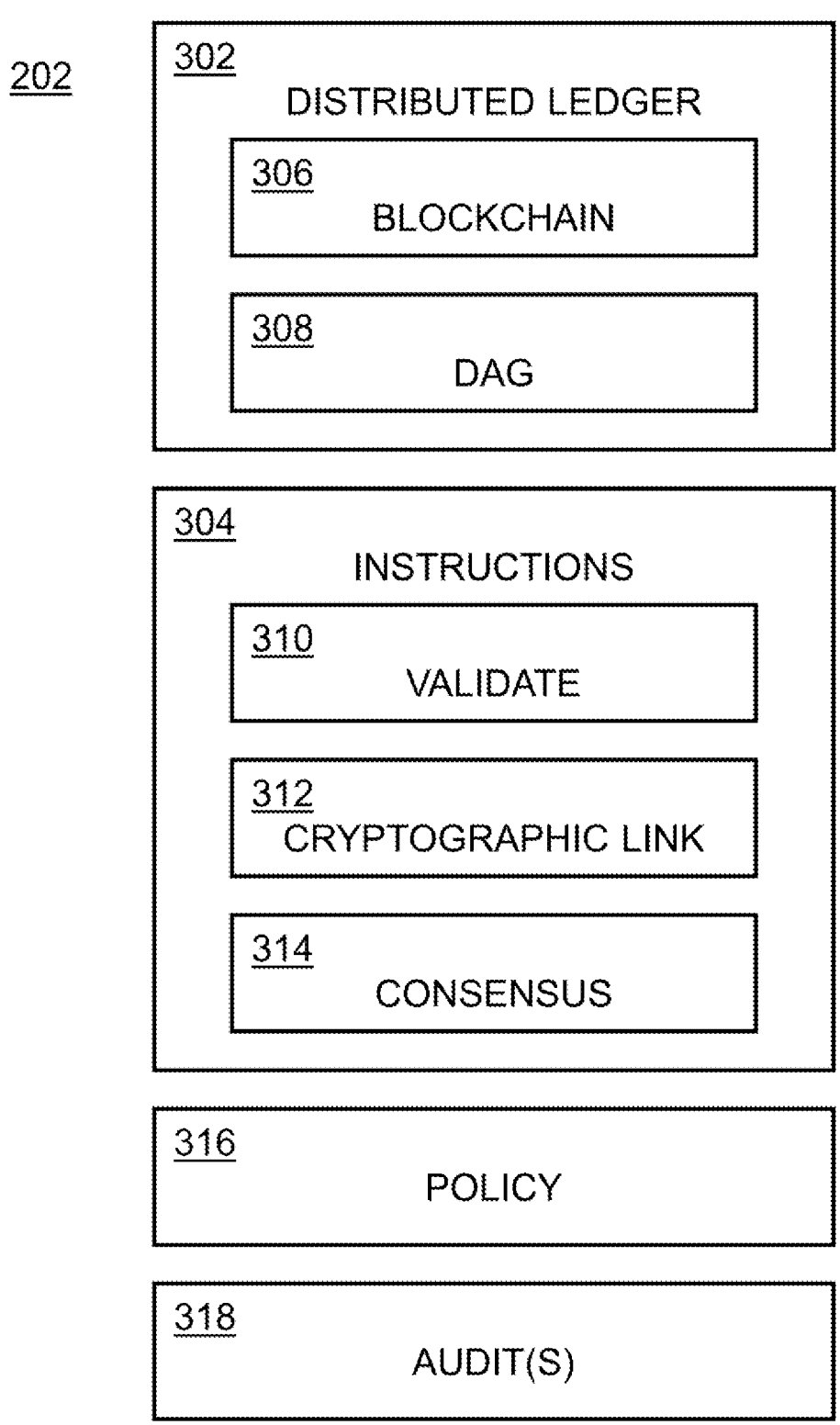
FIG. 3 depicts a simplified block diagram of a functions maintained on a memory of a node, in accordance with one or more embodiments of the present disclosure.

Referring now to FIG. 3, the memory 202 is described, in accordance with one or more embodiments of the present disclosure. In embodiments, the memory 202 maintains an instance of a distributed ledger 302, program instructions 304, root store policy 316, and/or audits 318.

The distributed ledger 302 may include a ledger of data. The ledger of data may be synchronized between the nodes 102, such that the ledger may be considered distributed. Each of the nodes 102 may maintain an instance of the distributed ledger 302 in memory 202, such that the ledger may be a digital ledger. The distributed ledger 302 may include any type of distributed ledger, such as, but not limited to, a blockchain 306 and/or a directed acyclic graph 308. The distributed ledger 302 may represent each transaction as a separate block connected by a directed edge to a previous block. Block may refer to a data structure including a header and a body with one or more transactions. The header may include data about the block, such as a cryptographic link to a previous block. The body may include data of validated transactions in the ledger. In embodiments, the distributed ledger 302 includes a decentralized root store. The decentralized root store may include a list of trusted root certificates. The list of trusted root certificates may be associated with one or more Public Key Infrastructure operators.

The root store policy 316 may include one or more requirements to be included in the list of trusted root certificates. The root store policy 316 may indicate the requirements for a root certificate of a Certificate Authority to be accepted into the root store maintained on the distributed ledger 302. The root store policy 316 may also indicate the requirements to be considered a trusted Certificate Authority and/or a trusted root certificate. The Certificate Authority must meet the root store policy 316 before admission to the root store. The root store policy 316 may include any number of policies, such as, but not limited to, key storage requirements, identity verification, audit criteria, audit period, algorithm/key sizes, and the like. The root store policy 316 may establish the requirements to determine if a PKI operator is in compliance with the policy and can be included in a root store.

The audits 318 may be an audit of compliance of the PKI owner with the root store policy. For example, the audits 318 may be third-party audits. The audits 318 may include various information suitable for auditing compliance of Certificate Authority with the root store policy 316, such as, but not limited to, auditor qualifications, audit standards, attestations, and the like. In embodiments, the audits 318 may be stored off-chain and linked to off-chain storage from the distributed ledger 302.

In embodiments, the distributed ledger 302 is managed by one or more rules. The rules may indicate the governance of the distributed ledger 302. For example, the governance of the distributed ledger 302 (e.g., root store policy, blockchain rules, etc.) may be managed either off-chain or on-chain through smart contracts.

The program instructions 304 may cause the processors to execute one or more functions, such as, but not limited to, validation 310, a cryptographic link 312, consensus mechanism 314, and the like. The functions may allow the nodes 102 to store a list of trusted certificate authorities in the distributed ledger 302.

The program instructions 304 may cause the one or more processors 204 to receive one or more transactions from the peer-to-peer network. The program instructions 304 may then cause the one or more processors 204 to transmit a validation of the one or more transactions to the peer-to-peer network in response to validating the one or more transactions.

The validation 310 may retrieving the root store policy from memory. The validation may include retrieving the audits 318 from the memory 202 and/or from the peer-to-peer network. The nodes 102 may display the audits to users of the nodes 102. The users may review the displayed audits against the root store policy to ensure the PKI owner is in compliance with the root store policy. The nodes 102 may then receive an input from the users. The input may indicate the root certificate conforms to the root store policy. The input may cause the nodes 102 to validate and/or invalidate the new transaction. In response to receiving the input, the nodes 102 may transmit a message to the nodes 102 in the network 100 indicating the new transaction is valid or invalid. Once a number of the nodes 102 indicates the new transaction valid, the new transaction is accepted and added as a new block. Once the number of the nodes 102 indicates the new transaction invalid, the new transaction is not accepted and is not added as a new block. The number of the nodes 102 required to validate or invalidate the new transaction may be based on a configuration of the network.

The cryptographic link 312 may link blocks of the distributed ledger 302 together. The cryptographic link 312 may include any suitable algorithm, such as, but not limited to, a hashing algorithm (e.g., SHA, etc.). The hashing algorithm may map data of any given length to a hash value having a fixed-length.

The program instructions 304 may cause the one or more processors 204 to execute the consensus mechanism 314 to resolve one or more conflicts. The consensus mechanism 314 may refer to a mechanism by which the nodes 102 arrive at a consensus before updating the distributed ledger 302. The consensus mechanism 314 may indicate the nodes agree to the validity of transactions within the distributed ledger 302. In particular, each of the nodes 102 may process the transactions using the consensus mechanism 314, arrive to a consensus, and then update the distributed ledger 302. In summary, when the distributed ledger 302 is updated with a new transaction the following occurs: the new transaction is validated by the other nodes of the network 100 to ensure that it is a valid transaction and complies with the policies; the new transaction is cryptographically linked to the previous one; conflicts are resolved through undergoing a consensus decision; and the new transaction is accepted into the distributed ledger 302. Consensus may refer to the nodes 102 agreeing on the valid state of the distributed ledger. The consensus mechanism 314 may also be referred to as a consensus model, a consensus algorithm, a consensus method, and the like.

The program instructions 304 may cause the one or more processors 204 to publish a new block to the peer-to-peer network. The new block may include the one or more transactions. The new block may be cryptographically linked to a previous block in the distributed ledger 302. The one or more transactions may include adding a root certificate to the list of trusted root certificate, revoking an issued root certificate from the decentralized root store, updating a key associated with an issued root certificate in the decentralized root store, and the like.

Figure 4:
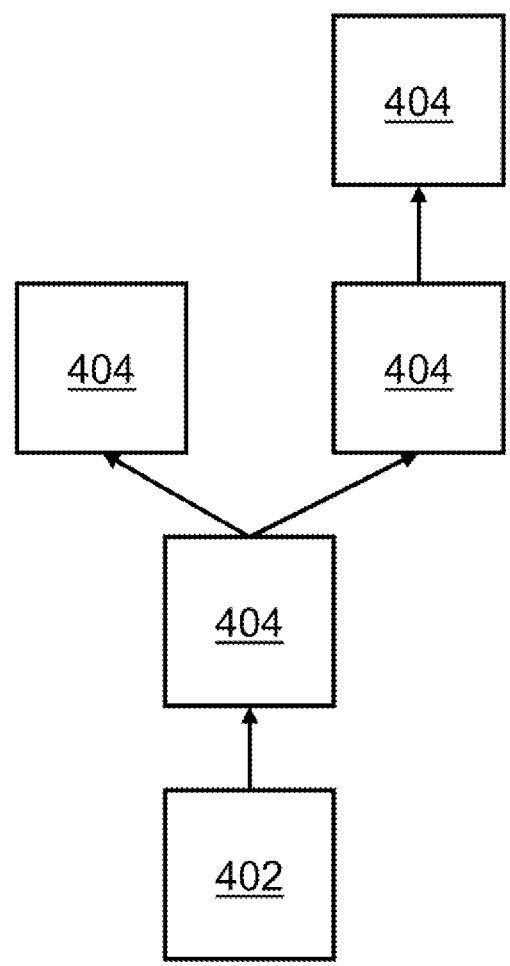
FIG. 4 depicts a blockchain, in accordance with one or more embodiments of the present disclosure.

Referring now to FIG. 4, the blockchain 306 is described, in accordance with one or more embodiments of the present disclosure. The term "Blockchain" is defined in NIST SP 800-160 Vol. 2 Rev. 1, as: "A distributed digital ledger of cryptographically-signed transactions that are grouped into blocks. Each block is cryptographically linked to the previous one (making the new block tamper evident) after validation and undergoing a consensus decision. As new blocks are added, older blocks become more difficult to modify (creating tamper resistance). New blocks are replicated across copies of the ledger within the network, and any conflicts are resolved automatically using established rules."

The blockchain 306 may include one or more blocks. For example, the blocks of the blockchain 306 may include, but is not limited to, a genesis block 402 and one or more blocks 404. The genesis block 402 may be the initial block in the blockchain 306. The blocks 404 of the blockchain may be connected to form a chain. Although the blocks are depicted as being linked with a line between the blocks, this is not intended as a limitation. The chain may use a cryptographic signature or hash to connect the blocks. The blocks 404 may be linked to a previous block in the blockchain 306 by the cryptographic hash maintained in the blocks 404. In response to reaching a consensus (e.g., by the consensus mechanism 314), the nodes 102 may store the transactions in a new block and cryptographically link the new block to the blockchain.

In embodiments, the nodes 102 are configured to store various information in memory 202 outside of the blockchain 306. Such storage may also be referred to as off-chain storage. The off-chain storage may be advantageous to reduce the memory requirements of the blockchain 306. The blockchain 306 may include a link to access the off-chain storage. The off-chain storage may store various information, such as, but not limited to, the audit 318. The PKI owner may upload the audits 318 to the off-chain storage. The nodes 102 may access the audits 318 by way of the blockchain 306 using the link to the off-chain storage from the blocks 404.

Figure 5A:
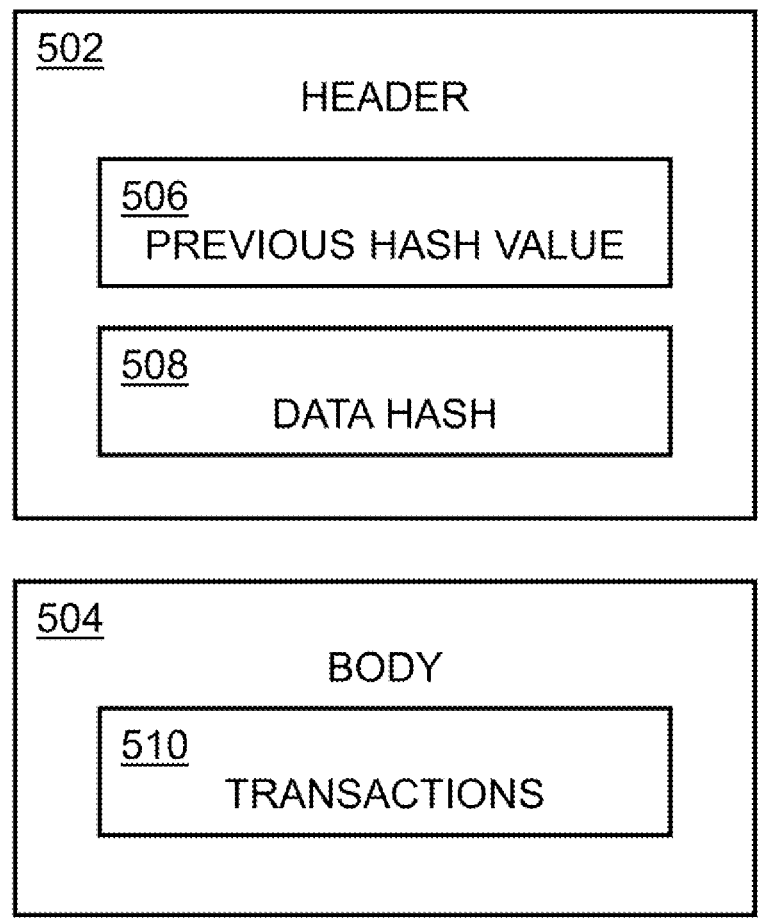
FIG. 5A depicts a block of a blockchain, in accordance with one or more embodiments of the present disclosure.

Referring now to FIGS. 5A-5B, the blocks 404 are described, in accordance with one or more embodiments of the present disclosure. The blocks 404 may store various information, such as, but not limited to, a header 502 and a body 504. The header 502 may contain, but is not limited to, a previous hash value 506, timestamp, a data hash 508, and the like. A hash value may be an alphanumeric string which is determined by a hash function. The block 404 may store the previous hash value 506 which is associated with the previous block in the blockchain 306. The previous hash value 506 may thus be used to cryptographically link the blocks. The data hash 508 may be a hash of the data in the body 504. In some instances, the data hash 508 may be a Merkle root of a Merkle tree used to hash the transactions in the body 504. In embodiments, the body 504 may include one or more transactions 510. Each block 404 may record multiple of the transactions 510 per block. The transactions 510 may represent a record of an activity which is stored in the blocks 404 of the blockchain 306.

As depicted in FIG. 5B, the transactions 510 are described, in accordance with one or more embodiments of the present disclosure. The transactions 510 may include, but are not limited to, an add root certificate transaction 512, a revoke root certificate transaction 514, an update key transaction 516, and the like. The add root certificate transaction 512 may be used to add new root certificates to the root store. The revoke root certificate transaction 514 may be used to revoke certificates which is in the root store. For example, the revoke root certificate transaction 514 may be used to remove fraudulent or mistakenly issued root certificates. The update key transaction 516 may include updating a key of one or more root certificate in the root store. A root certificate may refer to a public key certificate that identifies a root certificate authority. The root certificate may be self-signed. The root certificate may be a basis of a Public-Key Infrastructure (PKI).

In embodiments, the transactions 510 are used to maintain a root store 518 (e.g., a decentralized root store). The root store 518 may include a list of trusted root certificates for nodes 102 of the network 100. The root certificate may refer to a public key certificate identifying a root certificate authority (CA). The root store 518 may be maintained based on the add root certificate transaction 512, the revoke root certificate transaction 514, and/or the update key transaction 516.

In embodiments, the nodes 102 may receive one or more new transactions from the network 100. The nodes 102 may validate the new transactions. The validation may include that the root certificates conform to the root store policy 316. After validating the new transactions, the nodes 102 may resolve the new transactions through a consensus decision between the nodes 102. The consensus decision may be formed by the consensus mechanism 314.

In embodiments, the nodes 102 may include PKI operators. PKI operators may refer to certificate authorities who maintain a list of trusted certificates. PKI operators may run the nodes 102 to maintain the decentralized root store. The PKI operators may publish a root certificate to the decentralized root store 518. The root certificate may then be validated and then appended to the blockchain in a new block. In the case of a decentralized root store, some transactions are self-validating (e.g., PKI owner publishing the root certificate).

In embodiments, the nodes 102 may include the PKI users. PKI users may refer to users who use the list of trusted certificates maintained by the PKI operators. Advantageously, the PKI users may validate the current state of the distributed ledger 302, retrieve the block, and then use the recent block as the trusted root store 518. The PKI users may then use the list of root certificates for trusting the PKI operators. In embodiments, the PKI operators may retrieve the most recent block which is attached to the longest chain as the trusted root store 518.

Figure 6:
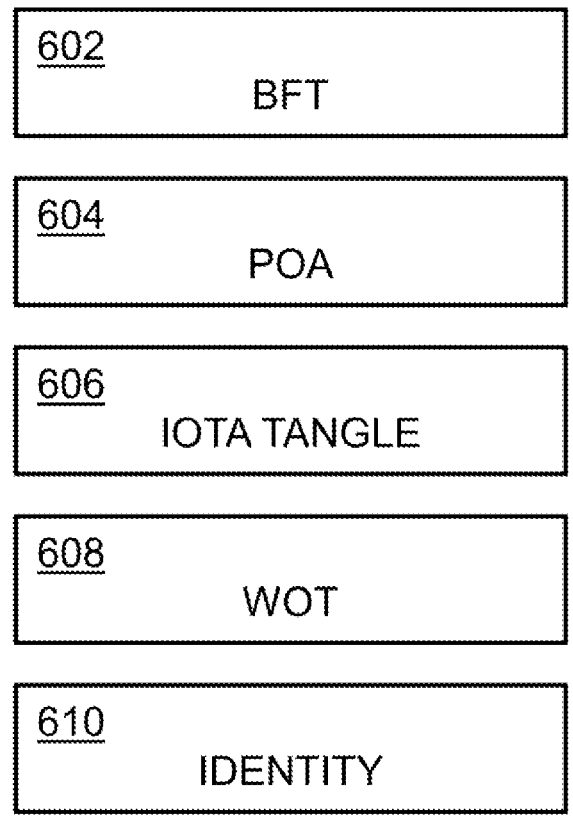
FIG. 6 depicts a consensus mechanism, in accordance with one or more embodiments of the present disclosure.

Referring now to FIG. 6, the consensus mechanism 314 is described, in accordance with one or more embodiments of the present disclosure. In embodiments, the consensus mechanism 314 may include any mechanism, such as, but not limited to, a Byzantine Fault Tolerance algorithm 602 (BFT), a proof of authority 604, an IOTA tangle algorithm 606, a web-of-trust algorithm 608, an identity algorithm 610, and the like. These mechanisms may be used independently or combined.

In embodiments, the consensus mechanism 314 may include a fault-tolerant consensus algorithm. The fault-tolerant consensus algorithm may include the Byzantine Fault Tolerance algorithm 602. The Byzantine Fault Tolerance algorithm 602 can be used to derive consensus across the blockchain 306. The Byzantine Fault Tolerance algorithm 602 may include any BFT algorithm, such as, but not limited to, Practical Byzantine Fault Tolerance (PBFT) and the like. The program instructions may cause the one or more processors to use the Byzantine Fault Tolerance algorithm 602 to resolve conflicts between the ordering of the one or more transactions together with one or more concurrent transactions. For self-validating transactions, the primary role of consensus may be to resolve conflicts between the ordering of various concurrent transactions. The Byzantine Fault Tolerance algorithm 602 can be used to resolve conflicts between the ordering of various concurrent transactions. A second category of transactions suitable for fault-tolerant consensus algorithms are blockchain-wide decisions. Some examples of blockchain-wide decisions could be a change in the root store policy or revocation of certificates by the community. The block-chain wide decisions may need to be approved by the community with consensus established across the blockchain by the Byzantine Fault Tolerance algorithm 602.

The proof of authority algorithm 604 is a consensus mechanism for permissioned blockchain exploiting the value of identities since validators stake their own reputation. The proof of authority algorithm 604 may provide benefits related to performance with respect to the Byzantine Fault Tolerant algorithms 602. In this regard, the proof of authority algorithm 604 may include a lighter message exchange than the Byzantine Fault Tolerant algorithms 602. The proof of authority algorithm 604 rely on a set of trusted peers (authorities) and on the assumption that the strict majority (N/2+1) of the authorities are honest. The authorities run a consensus to order the transactions issued in the system relying on a mining rotation schema to fairly distribute the responsibility of block creation. The rotation can be implemented dividing time into steps, each of which has an authority elected as mining leader. The high-level steps of the consensus process are: (i) a new block is computed and proposed by the current leader and (ii) the majority of the authorities validate and accept the proposed block.

The IOTA tangle 606 is a DAG-based consensus mechanism. The IOTA tangle 606 may be a consensus mechanism in which each new transaction validates multiple existing transactions. The IOTA tangle 606 may be used by a decentralized root store to validate new root store transactions. The IOTA tangle 606 may be tied to either access control from a permissioned blockchain or a proof of work function. For example, the IOTA tangle 606 may be tied to the access control from a permissioned blockchain or a proof of work function due to the anticipated low volume of transactions. The IOTA tangle 606 would reduce the overall number of transactions verified by any one party.

The web-of-trust algorithm 608 may be a DAG-based consensus mechanism. The web-of-trust algorithm 608 may cause existing users (i.e., blockchain transaction originators) to extend trust to new transactions by validating and then digitally signing those transactions. Causing the existing users to digital sign the transactions enforces that each new transaction is validated by an existing blockchain user.

The proof of identity 610 may cause a participant to make a legally binding attestation of their own identity. This attestation will be validated by the blockchain participants binding this participant with an identity. This identity provides protection from Sybil attacks. This identity can be used for other consensus operations such as voting. Additionally, the use of legal mechanisms ensures that evidence and accountability are created; this could enable adversarial transactions to be settled through legal avenues. The proof of identity 610 may also be referred to as a legally binding proof of identity. The proof of identity 610 may be combined with a DAG consensus mechanism (e.g., the IOTA tangle 606 and/or the web-of-trust 608) or a permissioned blockchain.

Figure 7:
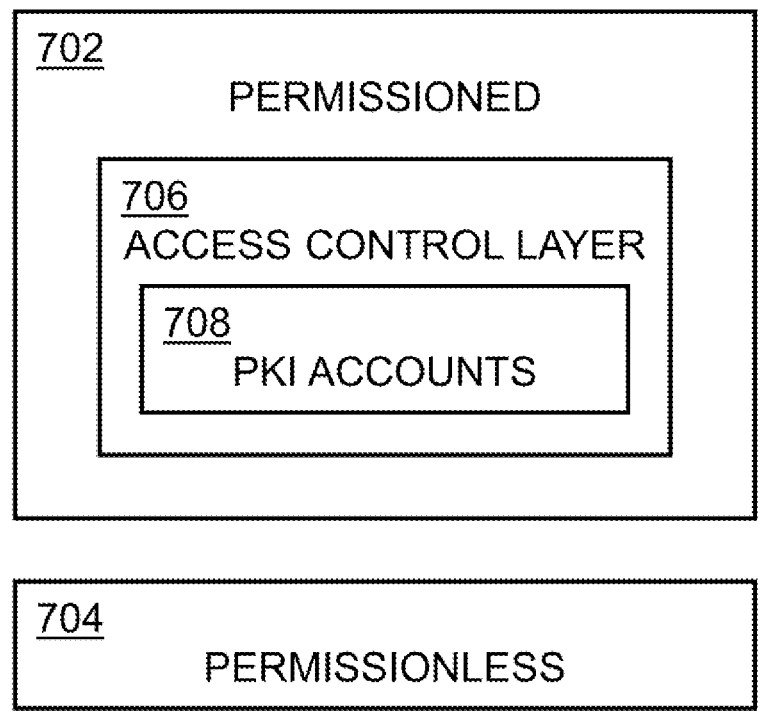
FIG. 7 depicts a distributed ledger, in accordance with one or more embodiments of the present disclosure.

Referring now to FIG. 7, the access and participation of the nodes 102 to the distributed ledger 302 is described, in accordance with one or more embodiments of the present disclosure. In embodiments, the distributed ledger 302 may include a permissioned blockchain 702 or a permissionless blockchain 704.

The permissioned blockchain 702 may require permission from one or more nodes 102 on the network 100 to access to the distributed ledger 302. The nodes 102 in the permissioned blockchain 702 may include an access control layer 706. The program instructions may cause the one or more processors to execute the access control layer. The access control layer 706 may be used to restrict access and participation to the distributed ledger 302, such as, but not limited to, a permissioned blockchain. For example, the access control layer 706 include management of PKI accounts 708. For instance, the management of the PKI accounts 708 may include creating a PKI account and/or administrate root store entries associated with the PKI account (e.g., their own root certificate). The PKI accounts 708 may include one or more tiers of access to the distributed ledger 302. For example, the PKI accounts 708 may include PKI owner. The access control layer 706 may identify the PKI owner as authorized to contribute to the root store. By way of another example, the PKI accounts 708 may include a PKI user. The PKI user may include read-access functionality to view the ledger but not to contribute transactions or blocks to the ledger. In embodiments, a proof of authority mechanism is used for consensus in the permission blockchain 702.

The permissioned blockchain 702 may maintain a list of PKI accounts. Each of the nodes 102 in the network may be associated with a PKI owner account in the list of PKI accounts. The PKI owner accounts may be validated to perform root store transactions associated with the node. In this regard, each node may be validated to perform root store transactions which only impact the node. The transactions may also be considered self-validating by the PKI owners. In embodiments, the PKI owner account is validated to create new PKI owner accounts in the list of PKI accounts. The ability to create the new PKI owner accounts may enable the addition of new nodes to the permissioned blockchain.

The permissionless blockchain 704 may include no restriction to join and interact with the distributed ledger 302. The permissionless blockchain 704 may provide a true decentralization and openness at the cost of a higher cost for registering a transaction. The higher cost for registering the transaction may be due to the resource-intensive verification of network-wide transactions. The permissionless blockchain 704 may support a number of transactions associated with the root store. For example, the permissionless blockchain 704 may support adding a new certificate without the presence of a certificate authority, issuing a revocation request, and the like. In embodiments, the program instructions cause the one or more processors to execute the web-of-trust algorithm 608 with the proof of identity 610 for identification and administration of trusted root store PKI operators.

One potential instantiation of the above discussed solution stems from the following challenges and requirements: (1) all (or most) of the software will need to be signed, each of which may include sub-components or libraries developed by third parties; (2) there is a high cost associated to certificates signed by a Certification Authority (CA); (3) classical solutions are vulnerable to the Man in the Middle (MitM) attack on the trust chain; (4) external source of truth is needed to check for fraudulent or mistakenly issued certificates (currently realized through centralized Certificate Transparency logs) and to timely propagate revocations.

Examining the critical role covered by the PKI in proving that the software is genuine and trusted, it is deemed advisable to keep a semi-centralized governance of such an infrastructure even in presence of a distributed environment. On one hand, the distributed environment can support a significant cost reduction, a timely dissemination of key updates and a consistent view on the revoked or fraudulent certificates. On the other hand, the semi-centralized governance allows a relationship of trust on the members' integrity. As discussed above, this is realized by means of the permissioned blockchain 702. An additional benefit of such an approach is a faster distribution of the updates in comparison to the permissionless blockchain 704.

Figure 8:
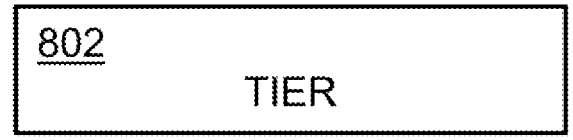
FIG. 8 depicts a multi-tier permissioned certificate network, in accordance with one or more embodiments of the present disclosure.
Figure 8:
Figure 8:
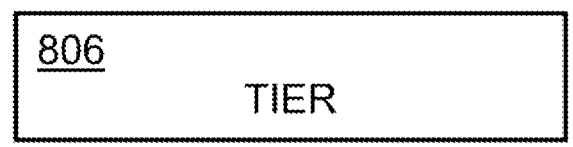

Referring now to FIG. 8, a multi-tier permissioned certificate network 800 is described, in accordance with one or more embodiments of the present disclosure. The multi-tier permissioned certificate network 800 may be an instantiation of the permissioned blockchain 702. The multi-tier permissioned certificate network 800 may include the adoption of the permissioned blockchain 702 with members having different roles and privileges. The roles may include a tier 802, a tier 804, and a tier 806.

The tier 802 may be considered a top level or a first tier. The tier 802 may include a limited first set of entities owning full rights (i.e., authorities) on the permissioned blockchain 702. The first-tier entities may include rights to submit root store transactions associated with the first-tier entities to the blockchain. The first-tier entities may include rights to add certificates for the second-tier entities and the third-tier entities to the decentralized root store. The program instructions may cause the one or more processors to execute a proof-of-authority consensus algorithm causing the node to add one or more certificates to the decentralized root store. In embodiments, the first-tier entities may include industry leaders in the aerospace industry.

The tier 804 may be considered an intermediate level or a second tier. The tier 804 may include second tier entities whose certificates are added to the permissioned blockchain 702 by the first-tier entities from the tier 802. Adding the second-tier entities to the tier 804 by the first-tier entities may allow for verification of the signature on the libraries and/or the software components of the second-tier entities by the first-tier entities. The second-tier entities may include rights to submit root store transactions associated with the second-tier entities to the blockchain. In embodiments, the second-tier entities may include contractors and third parties working on aerospace software.

The tier 806 may be considered a lowest level or a third tier. The tier 806 may include third tier entities with read-only access. The third-tier entities may then read the permissioned blockchain 702 for verifying signatures from the first-tier entities and/or the second-tier entities. For example, the third-tier entities may include airlines that have to verify the signature of heterogeneous airplane fleets.

The tiers of the multi-tier permissioned certificate network 800 may be maintained based on a certificate associated with the entities in the tier 802, the tier 804, and/or the tier 804. In embodiments, the certificates for the entities in the tier 804 and/or the tier 806 may be added by the proof of authority 604 consensus mechanisms. For example, the first set of entities in the tier 802 may stake their own reputation for admitting new parties and adding the corresponding certificates of the second and/or third set of entities.

Figure 9:
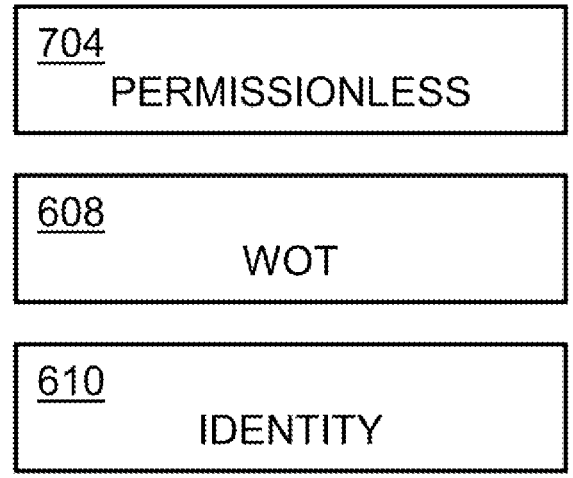
FIG. 9 depicts a permissionless certificate network with web-of-trust and proof of identity, in accordance with one or more embodiments of the present disclosure.

Referring now to FIG. 9, a configuration 900 is described, in accordance with one or more embodiments of the present disclosure. The configuration 900 may be referred to as a permissionless blockchain with a legally binding proof of identity. The configuration 900 is a root store that is built on the permissionless blockchain 704. The configuration 900 may use the web-of-trust algorithm 608 for consensus purposes. The configuration 900 may use the proof of identity 610 for identification and administration of trusted root store PKI operators.

Figure 10:
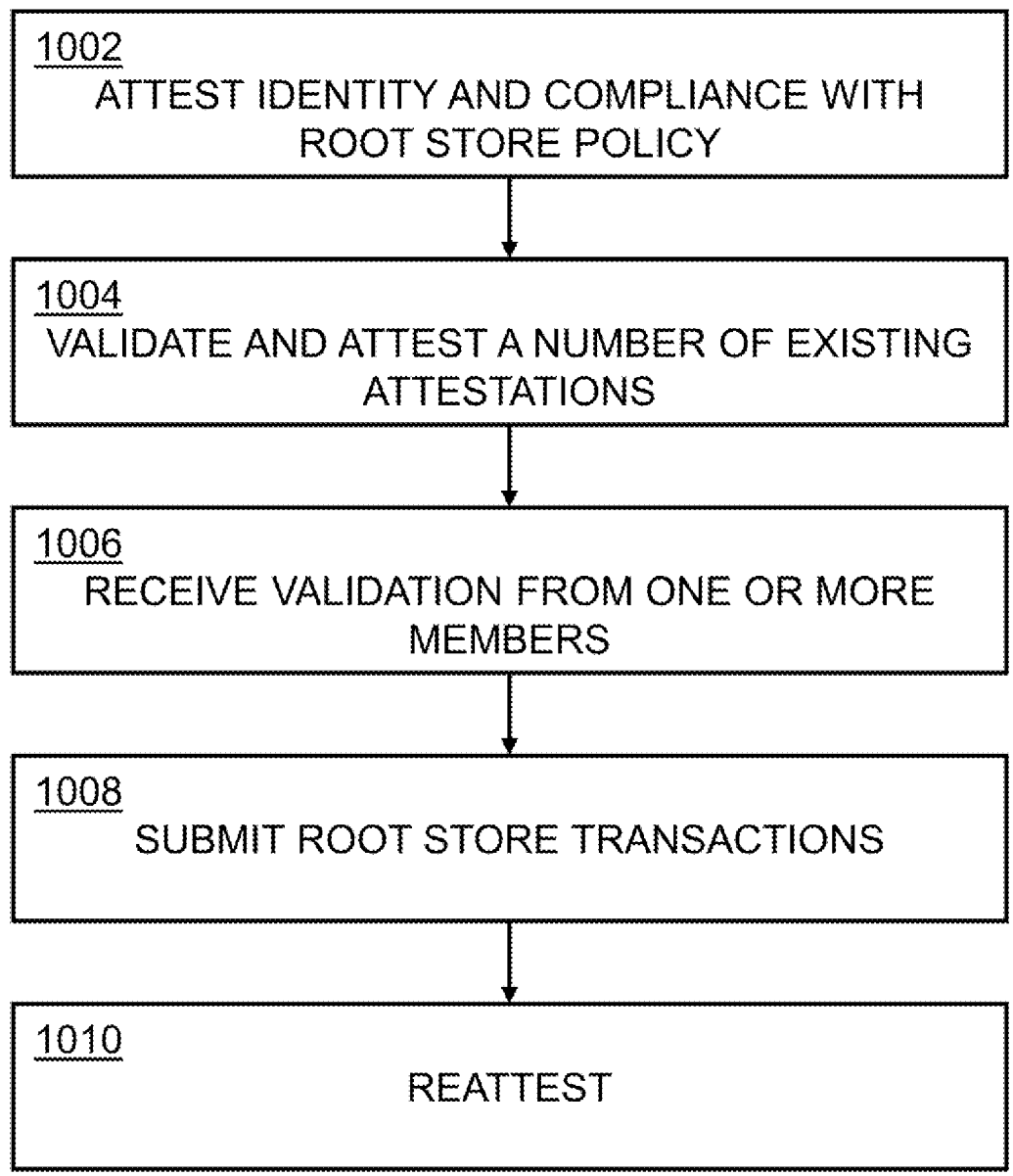
FIG. 10 depicts a flow diagram of a method, in accordance with one or more embodiments of the present disclosure.

Referring now to FIG. 10, a flow diagram of a method 1000, is described in accordance with one or more embodiments of the present disclosure. The embodiments and the enabling technology described previously herein in the context of the network 100 should be interpreted to extend to the method 1000. It is further recognized, however, that the method 1000 is not limited to the network 100. The method 1000 may be used by a PKI operator to join a network maintaining a blockchain.

In a step 1002, one or more attestations are published to a peer-to-peer network to join the peer-to-peer network as a trusted PKI operator. The program instructions may cause the one or more processors of a node to publish the one or more attestations. The node may be associated with a PKI operator. The attestations may include a first attestation as to the identity of the PKI operator. The attestation as to the identity of the PKI operator may include providing a root certificate of the PKI operator. The attestations may include a second attestation as to compliance of the PKI operator with a root store policy. The attestation as to compliance of the PKI operator with the root store policy may include uploading an audit. The audit may show the PKI operator is in compliance with the one or more requirements of the policy. By performing these attestations, each PKI operator is attesting that it is a valid legal entity and that it conforms to the policies of the root store.

In a step 1004, the PKI operator may validate and attest a number of existing attestations. The number of existing attestations may be configured based on the blockchain rules. The PKI operator's attestation has not been validated. Thus, the PKI operator is not yet considered a trusted operator and the validation it performed is not yet trusted. In embodiments, the network includes one or more rules. The rules may be used to identify and prioritize which unverified transactions should be verified next by a given operator. For example, the rules may include rules to limit collusion between operators (e.g., de-prioritization or exclusion of specific competitors). By way of another example, the rules may include rules to prevent lazy validation (e.g., only validating well-known PKI operators).

In a step 1006, the attestation as to the identity of the PKI operator and the attestation as to compliance of the PKI operator with the root store policy is validated by one or more members of the network. The node may receive the validation from one or more members of the network. The program instructions cause the one or more processors to publish the validation of one or more existing attestations to the blockchain in response to joining the peer-to-peer network as the trusted PKI operator. The validations may be transmitted in response to joining to prevent a Sybil attack. Validating the attestation by one or more existing members prevents the Sybil attacks in which an untrusted operator validates its own transaction by using several false identities. Validating the attestation by one or more existing members (e.g., existing nodes in the network) may require that an untrusted operator must be validated (directly or indirectly) by a previously trusted operator to become trusted. Once the PKI operator is validated, the validations from the PKI operator are then considered trusted and may be used to allow other PKI operators to join the network. The validation is an evaluation of evidence and not an audit of an entity's actions. As an example, when entity 1 validates the attestation of entity 2 (as part of creating a new blockchain transaction with the PKI operator account) it is validating the identity of entity 2 and validating the evidence of entity 2's compliance with the root store policy. Evidence that entity 1 may validate could include a published audit summary from a third-party's formal audit of entity 2 showing compliance with the root store policy. Thus, the validation is validating the audit results, but it does not require entity 1 to perform the audit of entity 2.

In a step 1008, the PKI operator may submit root store transactions once the PKI operator is trusted. The root store transactions may be associated with the PKI of the PKI operator. The root store transactions that are associated with the PKI of the PKI operator may include, but are not limited to, changing or revoking a certificate of the PKI operator. Only minimal validation for transactions that are associated with the PKI is required (e.g., ensuring that the PKI is associated with the PKI operator, ensuring that the transactions comply with the root store policy). A fault-tolerant consensus algorithm can be used to resolve conflicts (e.g., ordering of concurrent transactions).

The root store transactions may also include a blockchain-wide decision. The blockchain-wide decision may include, but is not limited to, revocation of an operator's trust or root store policy changes. A fault-tolerant consensus algorithm may be utilized in which trusted PKI operators have voting rights to approve or deny the blockchain-wide decision. The consensus algorithm may include, but is not limited to, proof of authority or proof of stake.

In a step 1010, the PKI operator makes one or more re-attestations. The re-attestation may be required for one or more of the trusted operators. The re-attestation may be performed at a given interval or period, such that the re-attestation may be considered a periodic re-attestation. The periodic re-attestation may be advantageous in increasing the stability of the blockchain and provide the ability to accept new operators. In this regard, the periodic re-attestation may incentivize the trusted operators to attest operators which have submitted an attestation for validation from a trusted operator. The re-attestations may include attesting identity and/or compliance with the root store policy. The re-attestations may also include validating and attesting a number of existing attestations.

The attestations may include one or more implications. For example, the attestations may provide evidence and accountability for a given PKI operator's attestations. This ensures that all PKI operators have a legal and financial interest in performing attestations correctly and completely. This also provides legal avenues to address any adverse transactions.

Referring generally again to FIGS. 1-10. Commercial aerospace is currently establishing Public Key Infrastructure (PKI) dedicated to aerospace specific needs. ATA Spec 42 provides recommendations for standardized methods and polices for PKI. This standard provides the default aerospace certificate policy and is being applied for various services including personal identity credentials (e.g., badges), software signing, and for avionics communications protocols (e.g., SATCOM). Currently, multiple organizations are creating their own PKI based on this standard. Each entity is creating their own independent federated PKI. Currently, no mechanism is used within aerospace to establish trust across these independent infrastructures/PKIs. In the case of software signing, a single software load may need to be signed multiple times (one for each PKI). This is complicated further for airlines that are managing a mixed fleet from multiple aircraft OEMs and with aftermarket equipment. Additionally, aerospace is an international operation, raising further problems for the airlines. It is contemplated that much of the present disclosure may be advantageous for providing a decentralized root store for a commercial aerospace application. The decentralized root store may be used in tandem with the independent federated PKIs. For example, PKI users may validated each of the independent federated PKIs in one process by using the decentralized root store.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A node comprising:
   a network interface coupling the node to a peer-to-peer network;
   a user interface;
   a memory maintaining program instructions, a root store policy, and an instance of a distributed ledger, wherein the root store policy comprises one or more key storage requirements and a key size, wherein the distributed ledger includes a decentralized root store, the decentralized root store including a list of trusted root certificates, wherein the root store policy includes one or more requirements to be included in the list of trusted root certificates; and
   one or more processors configured to execute the program instructions causing the one or more processors to:
      receive one or more transactions from the peer-to-peer network, wherein the one or more transactions include adding a root certificate to the list of trusted root certificates;
      transmit a validation of the one or more transactions to the peer-to-peer network in response to validating the one or more transactions, wherein validating the one or more transactions comprises retrieving the root store policy from memory, retrieving an audit from the peer-to-peer network, displaying the root store policy and the audit on the user interface, and receiving an input via the user interface, wherein the input indicates the root certificate conforms to the root store policy, wherein the audit is linked to an off-chain storage within the peer-to-peer network from the distributed ledger;
      execute a consensus mechanism to resolve one or more conflicts; and
      publish a new block to the peer-to-peer network, wherein the new block includes the one or more transactions, wherein the new block is cryptographically linked to a previous block in the distributed ledger.

2. The node of claim 1, wherein the one or more transactions includes revoking an issued root certificate from the decentralized root store.

3. The node of claim 1, wherein the one or more transactions includes updating a key associated with an issued root certificate in the decentralized root store.

4. The node of claim 1, wherein the distributed ledger is a blockchain.

5. The node of claim 4, wherein the blockchain is a permissioned blockchain; wherein the program instructions cause the one or more processors to execute an access control layer, wherein the access control layer is configured to restrict access and participation to the permissioned blockchain.

6. The node of claim 5, wherein the consensus mechanism includes a proof of authority.

7. The node of claim 5, wherein the permissioned blockchain maintains a list of PKI accounts, wherein the node is associated with a PKI owner account in the list of PKI accounts which is validated to perform root store transactions associated with the node.

8. The node of claim 7, wherein the PKI owner account is validated to create new PKI owner accounts in the list of PKI accounts.

9. The node of claim 5, wherein the permissioned blockchain is a Multi-Tier Permissioned Certificate Network including:

a third tier including third-tier entities with read-only access;

a second tier including second-tier entities, wherein the second-tier entities include rights to submit root store transactions associated with the second-tier entities to the permissioned blockchain; and a first tier including first-tier entities, wherein the first-tier entities include rights to submit root store transactions associated with the first-tier entities to the permissioned blockchain, wherein the first-tier entities include rights to add certificates for the second-tier entities and the third-tier entities to the decentralized root store.

10. The node of claim 9, wherein the node is associated with one of the first-tier entities, wherein the program instructions cause the one or more processors to execute a proof-of-authority consensus algorithm causing the node to add one or more certificates to the decentralized root store.

11. The node of claim 4, wherein the blockchain is a permissionless blockchain.

12. The node of claim 11, wherein the program instructions cause the one or more processors to execute a web-of-trust algorithm with a proof of identity for identification and administration of trusted root store PKI operators.

13. The node of claim 1, wherein the node is associated with a PKI operator, wherein the program instructions cause the one or more processors to publish a first attestation and a second attestation to the peer-to-peer network to join the peer-to-peer network as a trusted PKI operator, wherein the first attestation is an identity of the PKI operator, wherein the second attestation is compliance with the root store policy, wherein the second attestation comprises an additional audit, wherein the additional audit shows the PKI operator is in compliance with the one or more requirements of the root store policy, wherein the additional audit is linked to an additional off-chain storage within the memory from the distributed ledger.

14. The node of claim 13, wherein, in response to joining the peer-to-peer network as the trusted PKI operator, the program instructions cause the one or more processors to publish a validation of one or more existing attestations to the peer-to-peer network to prevent a Sybil attack.

15. The node of claim 1, wherein the list of trusted root certificates are associated with one or more Public Key Infrastructure operators.

16. The node of claim 1, wherein the consensus mechanism includes a fault-tolerant consensus algorithm; wherein the fault-tolerant consensus algorithm is a Byzantine Fault Tolerance algorithm; wherein the program instructions cause the one or more processors to use the Byzantine Fault Tolerance algorithm to resolve conflicts between an ordering of the one or more transactions together with one or more concurrent transactions.

17. The node of claim 1, wherein the distributed ledger is a directed acyclic graph.

18. A peer-to-peer network comprising:
a plurality of nodes, each of the plurality of nodes comprising:
a network interface coupling the plurality of nodes to the peer-to-peer network;
a memory maintaining program instructions, a root store policy, and an instance of a distributed ledger, wherein the root store policy comprises one or more key storage requirements and a key size, wherein the distributed ledger includes a decentralized root store, the decentralized root store including a list of trusted root certificates, wherein the root store policy includes one or more requirements to be included in the list of trusted root certificates; and
one or more processors configured to execute the program instructions causing the one or more processors to:
receive one or more transactions from the peer-to-peer network, wherein the one or more transactions include adding a root certificate to the list of trusted root certificates;
transmit a validation of the one or more transactions to the peer-to-peer network in response to validating the one or more transactions, wherein validating the one or more transactions comprises retrieving the root store policy from memory, retrieving an audit from the peer-to-peer network, displaying the root store policy and the audit on the user interface, and receiving an input via the user interface, wherein the input indicates the root certificate conforms to the root store policy, wherein the audit is linked to an off-chain storage within the peer-to-peer network from the distributed ledger;
execute a consensus mechanism to resolve one or more conflicts; and
publish a new block to the peer-to-peer network, wherein the new block includes the one or more transactions, wherein the new block is cryptographically linked to a previous block in the distributed ledger.

19. The peer-to-peer network of claim 18, further comprising a public-key infrastructure user, wherein the public-key infrastructure user is configured to retrieve the distributed ledger from one or more of the plurality of nodes, wherein the public-key infrastructure user is configured to use a trusted root certificate from the list of trusted root certificates to access a name and public-key pair maintained by a certificate authority.

* * * * *